No. 781,954. PATENTED FEB. 7, 1905.
G. W. KING & O. E. MOORE.
NUT LOCK.
APPLICATION FILED SEPT. 19, 1904.

Witnesses
E. J. Stewart
C. N. Woodward

George W. King
Otis E. Moore Inventors
by C. A. Snow & Co.
Attorneys

No. 781,954. Patented February 7, 1905.

UNITED STATES PATENT OFFICE.

GEORGE W. KING AND OTIS E. MOORE, OF LEBANON, MISSOURI.

NUT-LOCK.

SPECIFICATION forming part of Letters Patent No. 781,954, dated February 7, 1905.

Application filed September 19, 1904. Serial No. 225,023.

*To all whom it may concern:*

Be it known that we, GEORGE W. KING and OTIS E. MOORE, citizens of the United States, residing at Lebanon, in the county of Laclede and State of Missouri, have invented a new and useful Nut-Lock, of which the following is a specification.

This invention relates to nut-locks, and has for its object to simplify and improve the construction of devices of this character, provide an inexpensive and secure means for locking the nut to the bolt and effectually prevent reverse movement of the same, and which will be readily releasable without destroying any of the parts when the nut is to be detached.

With these and other objects in view, as will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
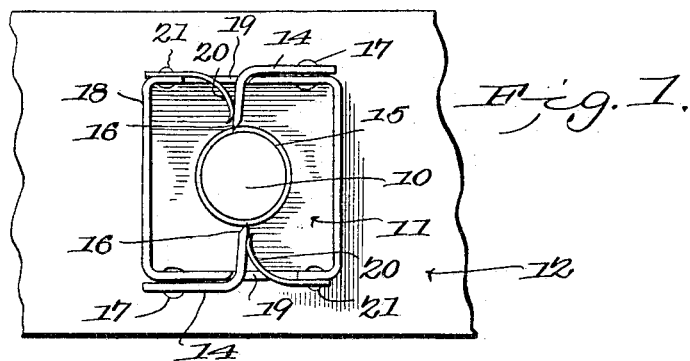
Figure 2:
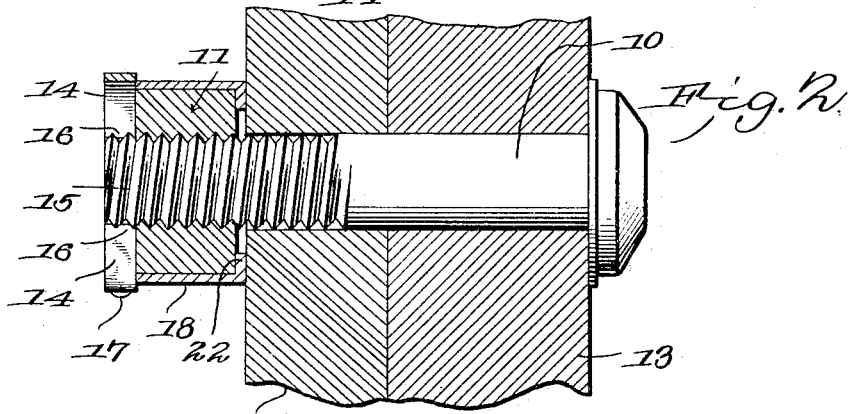
Figure 3:
Figure 3:
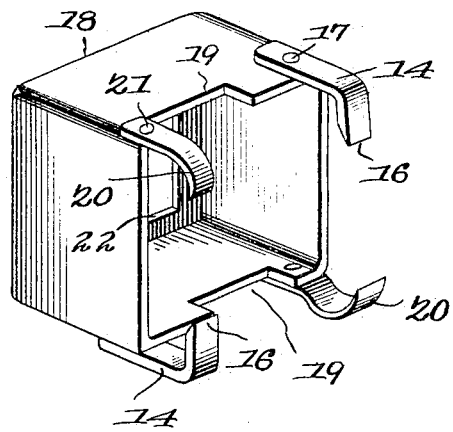
Figure 4:
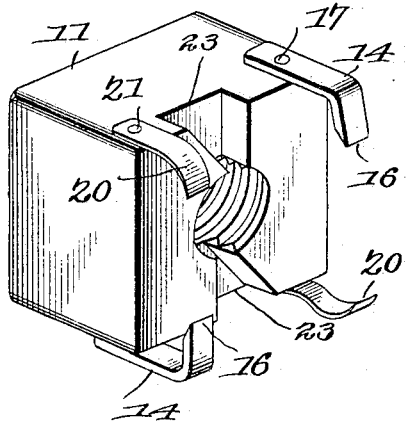

In the drawings thus employed, Figure 1 is a plan view of the improved device applied. Fig. 2 is a sectional side elevation. Fig. 3 is a perspective view, enlarged, of the casing carrying the movable locking-pawls. Fig. 4 is a perspective view of a nut, illustrating a modification in the construction.

The improved device may be applied to any form or size of nut or bolt, but for the purpose of illustration is shown applied to an ordinary bolt 10 and square nut 11, connecting to members 12 13.

The essential feature of the present invention consists in the provision of one or more pawls 15, pivotally carried upon the peripheral edge of the nut and of a length to project at the front face thereof, the free end of the pawl being disposed at substantially right angles to the main portion of the pawl across the outer face of the nut and provided with a chisel edge 16. This pawl is capable of being swung inwardly toward the face of the nut to engage its chisel edge with the threads of the bolt, so as to bite into the latter upon reverse rotation of the nut, and thereby prevent loosening thereof. It will of course be understood that the beveled portion of the chisel edge of the pawl is disposed so as to permit of the tightening of the nut without binding of the pawl upon the threads of the bolt. When it is desired to release the nut, the pawl is swung outwardly, as in Fig. 4, so as to disengage its free end from the threads of the bolt, whereupon the nut may be unscrewed without interference on the part of the pawl.

The pawls are fastened, as by pivots 17, to a casing 18, inclosing the nut and provided with recesses 19 in the outer rims, through which the pawls project when in operative position, as in Figs. 1 and 2. The free or operative ends of the pawls are slightly inclined, so that they engage the threads of the bolt at a tangent thereto to insure the requisite "nip" to cause them to hold the nut from reverse movement. Springs 20 are connected, as by rivets 21, to the casing 18 for projecting through each of the recesses 19 and bearing against the pawls 14 to hold them yieldably to their work. The casing 18 is formed with an inwardly-projecting flange 22 at the inner end, upon which the nut bears and by means of which the casing is firmly held in position when the nut is screwed "home."

By this simple arrangement it will be obvious that when the pawls are in operative position the nut can be turned forwardly to any desired extent and will not be retarded by the pawls, underneath which the threads will freely turn; but at the same time the chisel-ended pawl with its inclined position will effectually prevent reverse movement of the nut. The springs perform an important function in this connection by holding the pawls yieldably to their work. When it is desired to release the nut, it is only necessary to turn the pawls outwardly into the position shown in Fig. 3, as will be obvious. Thus no part of the device will be destroyed in releasing the nut; but the device will remain effective so long as the casings and nuts last and may be removed and attached an indefinite number of times. The improved device, it will thus be noted, requires no change whatever in the nut or bolt 10 and does not mar or mutilate the threads or weaken the parts in any manner.

Any number of the pawls may be employed; but two will generally be used, as shown.

If preferred, the pawls and springs may be connected directly to the nut, as in Fig. 4, with recesses 23, corresponding to the recesses 19, formed in the outer face of the nut; but this would not be a departure from the principle of the invention, as the same results are produced in substantially the same manner.

Having thus fully described the invention, what we claim is—

1. A nut having a pawl pivotally supported upon the periphery thereof to swing in substantial parallelism with the adjacent peripheral portion of the nut and of a length to be projected beyond one face of the nut, the outer free end of the pawl being disposed at an angle to the body portion and lying across said face of the nut and of a length to lap the bolt-opening of the nut for engagement with the threads of the bolt when the pawl is swung inwardly toward the adjacent face of the nut.

2. A nut having a pawl pivoted upon the peripheral edge of the nut and of a length to project at one face thereof, the free end of the pawl being disposed at an angle to the main portion of the pawl across said face of the nut and of a length to overlap the bolt-opening when swung inwardly toward the nut, and a spring pivoted upon the periphery of the nut opposite the pawl in position to have its free end bear against the pawl when swung in toward the nut and capable of being turned outwardly to project beyond the nut when it is desired to release the pawl.

3. A nut-lock comprising a casing to embrace a nut, and a pawl pivoted upon the periphery of the casing to swing across the same, said pawl being of a length to project at one end of the casing and having its free end disposed at an angle to the main portion of the pawl and lying across said end of the casing.

4. A casing for inclosing the nut and with a recess in its outer rim, a pawl pivoted to said casing and foldable into said recess for engaging the threads of the bolt and swinging free from the recess when the nut is to be released.

5. A casing for inclosing the nut and with a recess in its outer rim, a pawl pivoted to said casing at one side of said recess and foldable therein for engaging the threads of the bolt, and a spring connected to the casing at the other side of said recess for bearing upon the pawl.

6. A casing for inclosing the nut provided with an internal flange at the inner end upon which the nut bears, and a pawl pivoted at the outer end of said casing for engaging the threads of the bolt and swinging free therefrom when the nut is to be released.

In testimony that we claim the foregoing as our own we have hereto affixed our signatures in the presence of two witnesses.

GEORGE W. KING.
OTIS E. MOORE.

Witnesses:
GEORGE T. AYCOCK,
PHIL. W. HALL.